US012582943B2

(12) United States Patent
Shah et al.

(10) Patent No.: US 12,582,943 B2
(45) Date of Patent: Mar. 24, 2026

(54) SYSTEM AND METHOD FOR GROUNDWATER TREATMENT FOR NON-POTABLE USE

(71) Applicant: NCH Corporation, Irving, TX (US)

(72) Inventors: Rahul S. Shah, Scottsdale, AZ (US); Stuart Bailin, Clarendon Hills, IL (US)

(73) Assignee: NCH Corporation, Irving, TX (US)

( * ) Notice: Subject to any disclaimer, the term of this patent is extended or adjusted under 35 U.S.C. 154(b) by 472 days.

(21) Appl. No.: 18/133,676

(22) Filed: Apr. 12, 2023

(65) Prior Publication Data

US 2023/0372871 A1      Nov. 23, 2023

Related U.S. Application Data

(60) Provisional application No. 63/332,208, filed on Apr. 18, 2022.

(51) Int. Cl.

| | |
|---|---|
| *B01D 61/14* | (2006.01) |
| *B01D 61/02* | (2006.01) |
| *C02F 1/44* | (2023.01) |

(52) U.S. Cl.
CPC ......... *B01D 61/145* (2013.01); *B01D 61/026* (2022.08); *C02F 1/444* (2013.01); *B01D 2311/2512* (2022.08)

(58) Field of Classification Search
CPC .... B01D 61/025; B01D 61/026; B01D 61/04; B01D 61/145; B01D 61/58; B01D 2311/2512; C02F 1/42; C02F 1/441; C02F 1/444; C02F 1/722; C02F 5/08; C02F 2103/06; C02F 2301/08
See application file for complete search history.

(56) References Cited

U.S. PATENT DOCUMENTS 10,005,681 B2      6/2018   Tarquin et al.

FOREIGN PATENT DOCUMENTS

WO      WO-2010122336 A2 * 10/2010   ........... B01D 61/029

* cited by examiner

*Primary Examiner* — Patrick Orme
(74) *Attorney, Agent, or Firm* — Scheef & Stone, LLP; Robin L. Barnes

(57)      ABSTRACT

A system and method for reclaiming and treating groundwater collected from an underground level of a structure or building site to supply non-potable water to an end use system, such as an irrigation system, a pond, an equipment washing system, a cooling system, or a heating system. Groundwater seeps into such underground levels and has to be pumped out to prevent flooding the structure. Normally, this groundwater is discharged as a waste stream but can be treated for non-potable use using an three-stage treatment system comprising an ultrafiltration system, a water softener system, and a reverse osmosis system. The water softener system may be used or bypassed depending on acceptable TDS levels in the end use system and the TDS level of the reclaimed groundwater. Use of the system and method can save millions of gallons of groundwater per year per building site from being wasted.

23 Claims, 3 Drawing Sheets

SYSTEM AND METHOD FOR GROUNDWATER TREATMENT FOR NON-POTABLE USE

CROSS REFERENCE TO RELATED APPLICATION

This application claims the benefit of U.S. Provisional Application Ser. No. 63/332,208 filed on Apr. 18, 2022.

BACKGROUND OF THE INVENTION

1. Field of the Invention

This invention relates to a system and method for reclaiming and treating groundwater collected from subterranean structures for use in non-potable water applications, such as cooling and boiler systems.

2. Description of Related Art

Water is an essential part of life on Earth. Water shortages and scarcity concerns across the country (and world) have spurred increased efforts for individuals and industries to use less water and to reuse or recycle water when safe and possible. It is known to collect and reuse rainwater, stormwater, and grey water for various applications. However, it has not previously been known to collect and reuse the potentially large supply of groundwater frequently present at the site of building structures that include underground or sub-ground level areas or support structures. As used herein, references to building and structures include residential houses, multi-tenant housing, commercial buildings, office buildings, industrial buildings, schools, hospitals, arenas, shopping centers, and any other type of structure that has at least one level or portion located above ground level and another level or portion (which may or may not be occupiable or may be for structural support) below ground level.

When these structures are constructed, sub-surface or below ground level portion of the structure can be deep enough (even as deep as 100 feet) to penetrate the water table which results in a natural "bubbling up" of ground water to occur in these lower levels. The below ground level portion of the structure may be located entirely or partially below the water table for the area, resulting in groundwater flowing or seeping into the below ground area of the structure. It is known to collect this groundwater in a sump and discharge it into a wastewater or stormwater collection system, such as part of a municipal sewer system. The amount of groundwater collected can reach into the millions of gallons per year per structure. The groundwater is then treated by the municipalities' wastewater treatment systems (along with other sewage streams) and redistribute post-treatment, adding to the area's energy footprint and utility costs, as well as effectively wasting the groundwater that could be put to use at its source.

There is a need for a system that will allow this groundwater to be captured and treated at the origin structure site to allow it to be reused at or near the origin structure site for non-potable uses, such as irrigation, landscape ponds, and cooling and heating systems, including open loop, closed loop, recirculating, and once-through systems, such as cooling towers, chilled water systems, other evaporative cooling systems, and boilers. Such a treatment and reuse system would lessen the burden on municipal wastewater treatment systems, reduces costs to the owner or tenant of the structure in sewer bills and in reducing or eliminating the need to pay for fresh or potable water sources to supply water to these non-potable systems (that do not require water cleaned to the level of potable water), and reduces the environmental impacts associated with water usage for the structure.

SUMMARY OF THE INVENTION

According to one preferred embodiment, groundwater reclamation and treatment system and a method of reclaiming and treating groundwater for a non-potable end use application comprises: collecting groundwater and pumping it into a first treatment stage or a successive series of treatment stages for treatment to remove at least some biological contaminants, TSS, and TDS (as needed) prior to discharging a treated groundwater stream as a feed stream into a non-potable end use application. End use systems or end use applications can include any systems that uses water and is capable of using non-potable water at or near the origin/treatment site structure, such as irrigation, landscape ponds, equipment washing systems, and cooling and heating systems, including open loop, closed loop, recirculating, and once-through systems, such as cooling towers, chilled water systems, other evaporative cooling systems.

In one preferred embodiment, there is only a single treatment stage comprising either ultrafiltration of the groundwater to produce a filter groundwater stream that feeds into an end use system or reverse osmosis of the groundwater to produce a permeate groundwater stream that feeds into the end use system. In another preferred embodiment, there are two treatment stages, a first treatment stage comprises ultrafiltration of the groundwater and a second treatment stage comprises processing through one or more reverse osmosis membranes. In another preferred embodiment, there are three treatment stages, including a water softening stage comprising one or more water softener units. Most preferably, the water softener stage is disposed as the second stage in order, between the ultrafiltration stage (first stage) and reverse osmosis stage (third stage). In another preferred embodiment, the second treatment stage (water softening) is optional and a treatment system comprises components that allow the second stage to be used or bypassed depending on the water quality parameters (e.g. hardness) of the groundwater at the treatment site and the tolerance for hardness/TDS in the end use application. Having this as an option is beneficial as the groundwater composition or quality may change over time, which changes whether softening the water is necessary.

According to another preferred embodiment, a treatment system further comprises a filtration cleaning system and a backwash system. In one preferred embodiment, a filtration cleaning system comprises a tank for holding a cleaning composition, preferably $H_2O_2$, and a pump to discharge a dose of the cleaning composition to the ultrafiltration stage to clean an ultrafiltration membrane in that stage. In one preferred embodiment, a backwash system comprises a tank to hold a volume of water, preferably a portion of the filtered groundwater diverted downstream of the ultrafiltration stage, and pumps and valves that allow the water to be periodically used to backwash an ultrafiltration membrane.

According to another preferred embodiment, a treatment system further comprising an anti-scalant dosing system to dose a scale treatment composition into the partially treated groundwater stream upstream of a reverse osmosis treatment stage.

According to another preferred embodiment, a reverse osmosis stage comprises 3-5 or more reverse osmosis membranes arranged in series. According to one preferred embodiment, the reverse osmosis stage comprises high pressure reverse osmosis membrane units. According to another preferred embodiment, the reverse osmosis stage comprises low pressure reverse osmosis membrane units.

Although a different order of operating the stages in a treatment system may be used, most preferably the ultrafiltration stage is first, followed by the water softener stage (if needed), and finally the reverse osmosis stage is last. This particular order has been found to work synergistically to allow thousands of gallons of groundwater per day to be reclaimed for an end use application. Preferred embodiments of a treatment system and method have the advantage of allowing groundwater that would ordinarily be sent to waste or a sewer system to be used for an end use application to replace the use of fresh or potable water that would ordinarily be used in such end use application. Preferred embodiments have the advantage of being able to automatically monitor the quality of the groundwater at a particular building site to determine when the groundwater can be used and how it should be treated to produce a useable treated groundwater stream to feed into an end use application.

BRIEF DESCRIPTION OF THE DRAWINGS

The system of the invention is further described and explained in relation to the following figures wherein.

DESCRIPTION OF PREFERRED EMBODIMENTS

Figure 1:
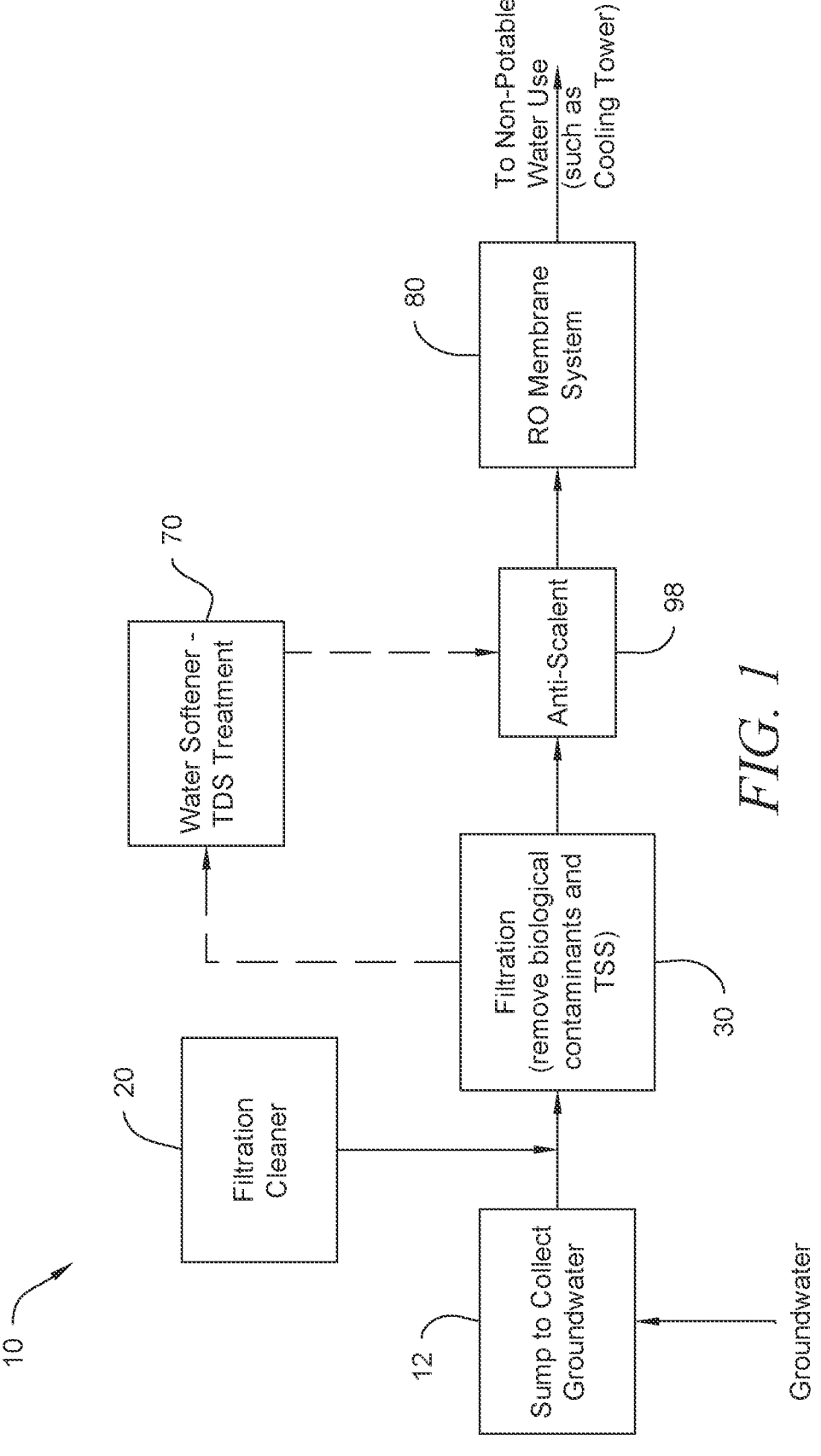
FIG. 1 is a schematic of a groundwater collection and treatment system according to a preferred embodiment of the invention.

Referring to FIG. 1, a groundwater treatment system 10 comprising several treatment stages for treating groundwater according to one preferred embodiment is shown. Treatment stages in groundwater treatment system 10 preferably comprise a filtration system 30 to remove at least some biological contaminants and total suspended solids (TSS), a reverse osmosis system 80 to remove at least some TDS (or at least some remaining TDS when an optional water softener system 70 is used), and optionally a water softener system 70 to remove at least some total dissolved solids (TDS) preferably upstream of the reverse osmosis system 80. TSS and TDS are typically comprised of calcium, iron, magnesium and silica, which can damage equipment in the treatment system 10 or the end use application system. Water softener system 70, when included, is preferably disposed downstream of the filtration system 30 and upstream of the reverse osmosis system 80. Water softener system 70 may only be needed if the groundwater contains a level of TDS that exceeds an acceptable level for the end use application. For example, when the end use application is make-up water for a cooling tower, the cooling tower equipment is more sensitive to TDS levels than an equipment washing or irrigation system end use application might be. Thus a given level of TDS in the groundwater may be acceptable for some end uses or may require treatment with a water softener system 70 for other end uses.

Filtration system 30 preferably comprises an ultrafiltration membrane unit, preferably sized according to the groundwater flow volume being treated. Additional ultrafiltration membrane units may be used in series to accommodate the desired groundwater flow volume for the desired non-potable end use and to achieve a desired maximum level of TSS. A desired maximum level of TSS in the groundwater exiting the filtration system 30 is around 0.025 microns.

Reverse osmosis system 80 is a high pressure system or a low pressure system, preferably comprising 3 to 5 membranes, most preferably five membranes, arranged in series. A high pressure system 80 preferably operates at a pressure of around 60 to 100 psig, most preferably around 100 psig. A low pressure system 80 preferably operates at a pressure of around 20 to 60 psig, most preferably around 30 psig. More preferably, system 80 is a low pressure system comprising three to five membranes arranged in series. Additional reverse osmosis membrane units may be used in series to accommodate the desired groundwater flow volume for the desired non-potable end use and to achieve a desired maximum level of 50 mmhos or less in a final permeate groundwater stream exiting reverse osmosis system 80 to feed into an end use system.

Optional water softener system 70 preferably comprises one or more water softener units, preferably at least two units operated in parallel. Additional softener units may be used in series to accommodate the desired groundwater flow volume for the desired non-potable end use and to achieve a desired maximum level of 2 ppm TDS. A desired maximum level of TDS in the groundwater exiting the water softener system 70 is around 2 ppm or less, more preferably around 1 ppm or less, and most preferably around 0.5 ppm or less. When optional water softener system 70 is used, system 10 also preferably comprises additional piping and valves to allow for system 70 to be bypassed or taken off-line in normal operation of system 10. This allows for system 70 to be used when the groundwater composition needs softening to achieve the desired maximum TDS level or bypassed when the groundwater composition does not need softening. As the groundwater composition can change over time, it can be advantageous to have softener system 70 available when needed and in use only when needed. Softener system 70 is preferably used when the groundwater (from sump system 12 or the filtered groundwater stream exiting from ultrafiltration system 30) has a TDS level greater than or equal to 500 ppm.

Groundwater treatment system 10 also preferably comprises a filtration cleaning system 20 and an anti-scalant dosing system 98. Filtration cleaning system 20 is preferably used to add small amounts of a treatment composition, preferably $H_2O_2$, to the filtration system 30, and to periodically backwash the filtration system 30. Anti-scalant dosing system 198 preferably comprises a scale treatment composition that is added to the groundwater during processing through system 10. Most preferably, a scale treatment composition is added downstream of the filtration system 30 (and downstream of the optional water softener system 70 if included) and upstream of the reverse osmosis system 80.

A sump system 12 preferably comprises a cistern or container to receive and collect groundwater as it flow into or seeps into an underground level of a building site and a pump to pump the groundwater from the container. For building sites with an existing sump system 12, groundwater treatment system 10 may be added onto the existing sump system 12 at the building site so that groundwater collected in sump system 12 is pumped to the treatment stages of system 10. For new building sites, or existing sites without a pre-existing sump system 12, groundwater treatment system 10 may also comprise the sump system 12 as part of the overall treatment system.

Figure 2A:
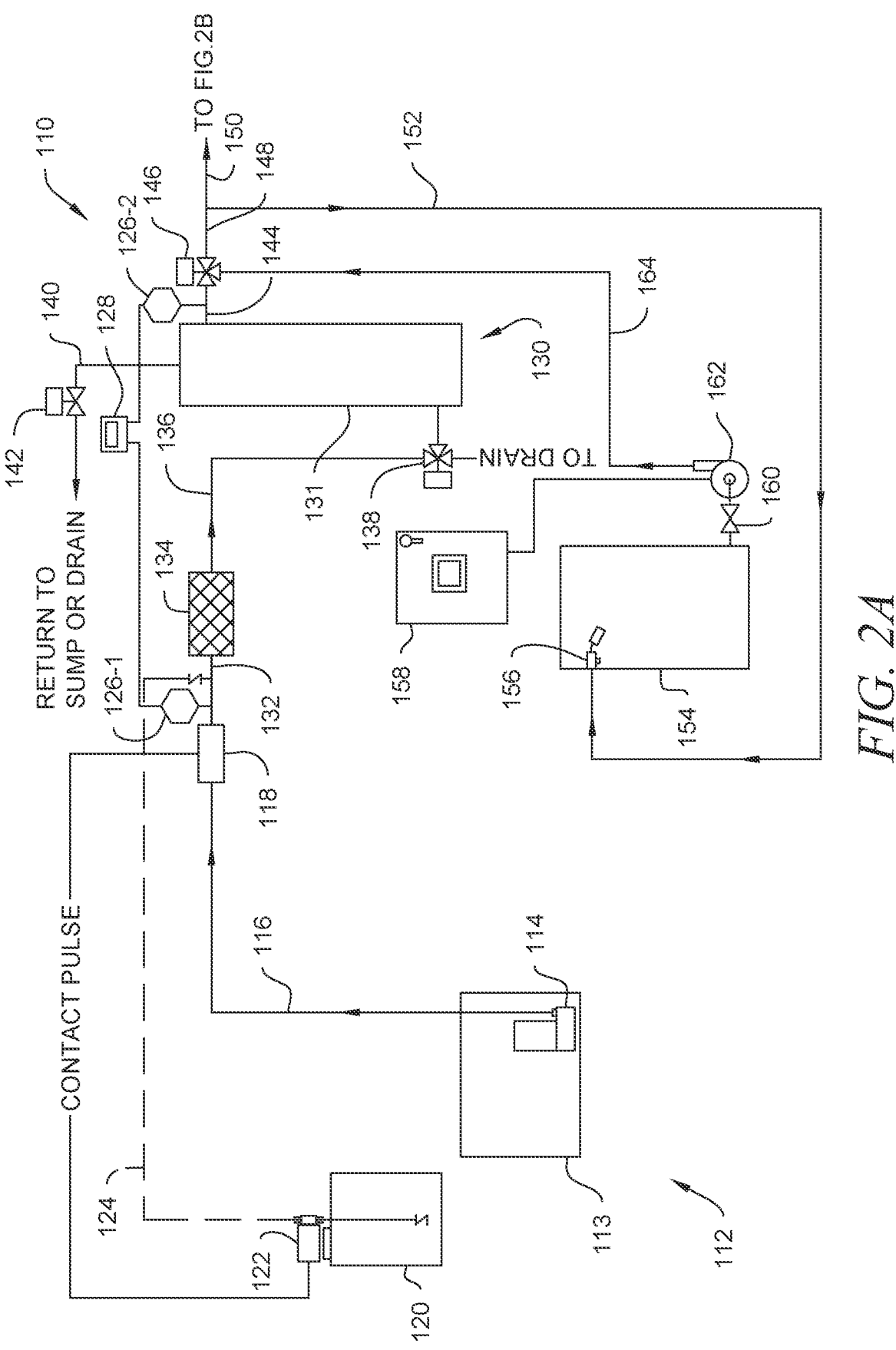
FIGS. 2A-2B are more detailed schematics of a groundwater collection and treatment system according to another preferred embodiment of the invention.
Figure 2B:
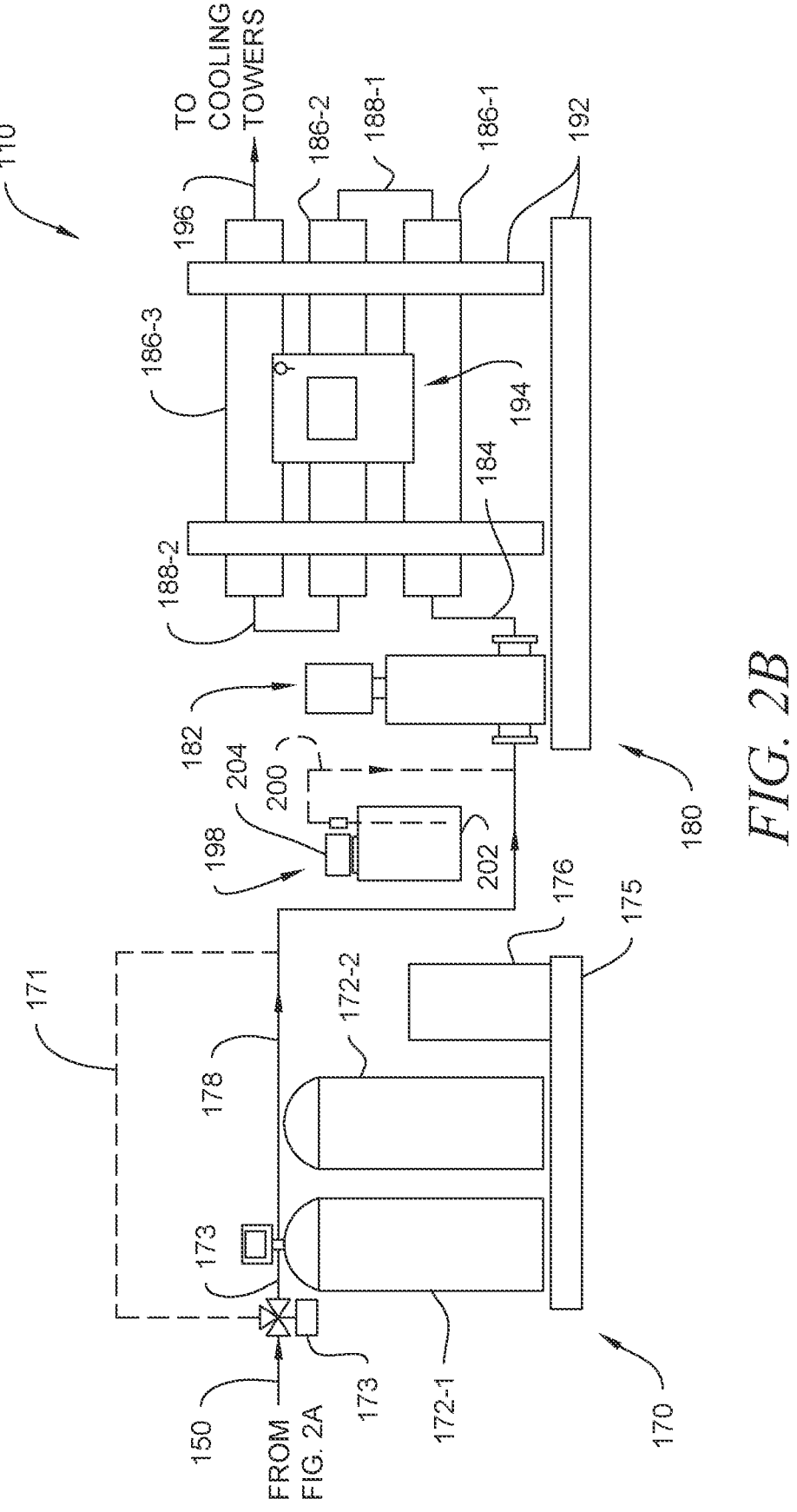

Referring to FIGS. 2A-2B, a groundwater treatment system 110 comprising several treatment stages for treating groundwater according to another preferred embodiment is shown. Treatment stages in groundwater treatment system 110 preferably comprise a filtration system 130 to remove at least some biological contaminants and total suspended solids (TSS), a reverse osmosis system 180 to remove at least some TDS (or at least some remaining TDS not removed by an optional water softener system 170) of and optionally a water softener system 170 to remove at least some total dissolved solids (TDS). Water softener system 170, when included, is preferably disposed downstream of the filtration system 130 and upstream of the reverse osmosis system 180. The order of the stages is important when all three stages are used, with the water softener system 170 being between the ultrafiltration system 130 and reverse osmosis system 180 so that a product stream from system 130 feeds into system 170 and a product stream from system 170 feeds into system 180 Treatment system 110 also preferably comprises a control system to control various components in the system as further described herein.

Filtration system 130 preferably comprises an ultrafiltration membrane unit 131, preferably sized according to the groundwater flow volume being treated. Filtration system 130 is preferably a commercially available system, such as those available from 3M or Dupont. Additional ultrafiltration membrane units 131 may be used in series to accommodate the desired groundwater flow volume for the desired non-potable end use and to achieve a desired maximum level of TSS. A desired maximum level of TSS and biological contaminants in the groundwater exiting the filtration system 130 is the same as with system 30.

Reverse osmosis system 180 is a high pressure system or a low pressure system, preferably comprising 3 to 10 membrane units 186-1, 186-2, 186-3, etc., most preferably five membrane units, arranged in series, like system 80. A high pressure system 180 preferably operates at a pressure of around 60 to 100 psig, most preferably around 100 psi. A low pressure system 180 preferably operates at a pressure of around 20 to 60 psig, most preferably around 30 psi. More preferably, system 180 is a low pressure system comprising five membranes or more arranged in series. Reverse osmosis system 180 is preferably a commercially available skid mounted system, such as those available from Mario Incorporated. As components of system 110 may be located some distance from sump system 112, an additional pump may need to be included in system 110, such as on line 178, to maintain sufficient pressure of the groundwater flowing through the system.

Reverse osmosis system preferably comprises a pump 182, multiple flow lines, support structures 192 (preferably a skid and two or more columns to support membrane units 186-1, 186-2, etc.), a RO System Control Unit 194, and a plurality of membrane units 186-1, 186-2, etc. Most preferably, a flow line 184 connects reverse osmosis pump 182 in fluid communication with a first membrane unit 186-1. Flow lines 188-1, 188-2, etc. preferably connect a permeate discharge end of one membrane unit 186 to a feed end of the next downstream membrane unit 186. A final permeate discharge line 196 of the last downstream membrane unit (e.g. 186-3 in FIG. 2B) is a feed line into the end use application, such as a cooling tower. Additional reverse osmosis membrane units 186 may be used in series to accommodate the desired groundwater flow volume for the desired non-potable end use and to achieve a desired maximum level of >50 mmhos and 0 to 50 TDS, which is the same as with system 80. Concentrate streams from each membrane unit 186-1, 186-2, etc. are discharged to a drain or waste system (not shown). Membranes in membrane units

186-1, 186-2, etc. may be periodically cleaned or replaced as needed using standard cleaning procedures as recommended by the manufacturer or known in the art.

Optional water softener system 170 preferably comprises one or more water softener units 172-1, 172-2, etc., and a softener or brine tank 176, which are preferably mounted on a skid 175. Most preferably, there are two softener units 172-1 and 172-2 operated in parallel. Water softener system 170 is preferably a commercially available system, such as a skid-mounted, twin parallel softener available from Marlo, Incorporated. Softener system 170 is preferably configured and sized to accommodate the desired groundwater flow volume for the desired non-potable end use and to achieve a desired maximum level of 0-50 ppm total hardness. A desired maximum level of TDS in the groundwater exiting the water softener system 170 is the same as with system 70. When optional water softener system 170 is used, system 110 also preferably comprises additional piping 171 and a three-way valve 173 to allow for system 170 to be bypassed or taken off-line in normal operation of system 110. This allows for system 170 to be used when the groundwater composition needs softening to achieve the desired maximum TDS level or bypassed when the groundwater composition does not need softening. As the groundwater composition can change over time, it can be advantageous to have softener system 170 available when needed and in use only when needed. Softener system 170 is preferably used when the groundwater has a TDS levels greater than those indicated for use of system 70.

Groundwater treatment system 110 also preferably comprises a filtration cleaning system comprising a cleaning composition dosing system to add small amounts of a treatment composition, preferably $H_2O_2$, to the filtration system 130, and a backwash system to periodically backwash the filtration system 130.

A cleaning composition dosing system preferably comprises a tank or container 120 for holding a volume of a treatment or cleaning composition, preferably a 30% $H_2O_2$ solution, a water meter 118, a pump 122 connected to the water meter 118, a supply line 124 connected in fluid communication with container 120 and another flow line (such as line 132) in system 110 to deliver the treatment or cleaning composition to the groundwater upstream of ultrafiltration membrane unit(s) 131 of filtration system 130, and a mixer 134 (preferably a static mixer) to mix the treatment or cleaning composition with the groundwater prior to delivery to the ultrafiltration membrane unit(s).

Most preferably, pump 122 is configured to receive a signal or a pulse from water meter 118 indicating when a dose of cleaning treatment composition should be delivered from tank 120 and the signal or pulse activates pump 122 to deliver a desired dosage. Cleaning treatment dosing is preferably triggered by the amount of groundwater flowing through water meter 118. Preferred dosage amounts are around 0.1 to 0.2 ml, more preferably around 0.1 to 0.15 ml per gallon. Water meter 118 and pump 122 may alternatively be connected through a controller 158 configured to receive a signal from water meter 118 and send a signal to pump 122 in response to the water meter signal to active pump 122 to deliver a desired dosage. As another alternative, dosage (activation of pump 122) may also be triggered by a timer rather than flow through meter 118. Gravity feed from container 120 may also be used instead of pump 122. When gravity feed is used, a valve is activated to allow sufficient flow of treatment product from container 120 to achieve the desired dosage. Activation of the valve my be either by flow through water meter 118 (directly connected to water meter 118 or through controller 158) or by a timer. Other injection systems, such as a venturi injector, may also be used to deliver cleaning composition into the groundwater upstream of ultrafiltration system 130.

A backwash system also preferably comprises a tank or container (or backwash tank) 154, a three-way valve 146, a pump 162, flow lines 152, 164 in fluid communication with tank 154 to allow groundwater into and out of tank 154 for a backwash cycle, a backwash drain flow line 140 in fluid communication with ultrafiltration membrane unit 131, a valve 156 (preferably a float valve) disposed with respect to container 154 to be activated based on a level of groundwater in container 154, a valve 160 (a discharge or drain valve connected to tank 154), a valve 142 (a drain or discharge valve connected to ultrafiltration membrane unit 131).

A backwash cycle is preferably initiated or triggered automatically based on a number of gallons of groundwater processed by ultrafiltration system 130 (such as every 3,000-10,000 gallons processed between backwash cycles). Alternatively, a backwash cycle may be initiated or triggered to begin when based on a conductivity measurement (preferably from sensor 126-2) or measurement of another water quality parameter, when a level of groundwater in container 154 reaches a predetermined level that it activates the float valve 156, based on a timer, or based on cumulative groundwater flow through system 110. When initiated by float valve 154, float valve is preferably connected to controller 158 to send a signal that the level of filtered groundwater in container 154 has triggered the float to initiate a backwash cycle. When initiated by flow volume, meter 118 preferably sends a signal to controller 158 when a flow of groundwater exceeds a predetermined cumulative threshold, most preferably around 3,000-10,0000 gallons, which then resets the flow value to zero after the signal is sent to begin the flow measurement cycle again. Most preferably, pump 162, a three-way valve 148, and valve 142 are all connected to controller 158, which is configured to send and receive signals from these components to activate pump 162 and actuate valves 142 and 148 to allow groundwater to flow from backwash tank 154 through ultrafiltration membrane unit 131 and out through backwash drain flow line 140 during a backwash cycle when the backwash cycle is triggered. valve 160 may be a manually activated valve normally left in an open position or it may be activated by controller 158 or by a direct connection to float valve 156.

Anti-scalant dosing system 198 is most preferably disposed to inject a scale treatment composition into the groundwater flowing through system 110 downstream of the filtration system 130 (and downstream of the optional water softener system 170 if included) and upstream of the reverse osmosis system 180. Most preferably, injection takes place immediately upstream of reverse osmosis system 180 or immediately upstream of feeding into the first membrane unit 186-1. Anti-scalant dosing system preferably comprises a tank or container 202 for holding a volume of a scale treatment composition, a pump 204, and a supply line 200 connected in fluid communication with container 202 and another flow line (such as line 178) in system 110 to deliver the anti-scalant treatment composition to the groundwater upstream of reverse osmosis system 180. Anti-scalant dosing system 198 adds a small amount of a scale treatment composition to the groundwater before it enters reverse osmosis system 180 to aid in protecting the membranes in reverse osmosis membrane units 186 from calcium and magnesium in the groundwater, which may damage the membranes. Any commercially available scale treatment composition may be used, preferably an environmentally friendly composition that does not include any regulated metals.

The dosage of scale treatment composition added will vary based on the water quality and parameters of the groundwater (such as hardness), but is preferably around 1.35 gallons of treatment per 33.7 gallons of groundwater or according to manufacturer's recommended dosage. Most preferably, the groundwater at the specific site in which system 110 is being used is tested to determine a dosage of scale treatment. The groundwater is also preferably periodically re-tested to ensure no changes in the dosage amount is needed. Most preferably, pump 204 is activated by a signal received from controller 158 in response to a signal controller 158 receives from water meter 118 indicating the flow rate of groundwater through system 110. Alternatively, pump 204 may be configured to receive an activation signal directly from water meter 118 or may be activated by a timer based on average groundwater flow rates through system 110. As an additional alternative, pump 204 may be automatically activated by a sensor reading indicating a water quality parameter (e.g. hardness or conductivity) of the groundwater flowing through system 110, preferably after initial treatment stages and just upstream of anti-scalant dosing system 198 (and upstream of reverse osmosis system 180). Other injection systems, such as a venturi injector, may also be used to deliver scale treatment composition into the groundwater upstream of reverse osmosis system 180.

A sump system 112 preferably comprises a cistern or container or tank 113 to receive and collect groundwater as it flow into or seeps into an underground level of a building site and a pump to pump the groundwater from the container. For building sites with an existing sump system 112, groundwater treatment system 110 may be added onto the existing sump system 112 at the building site so that groundwater collected in sump system 112 is pumped to the treatment stages of system 110. For new building sites, or existing sites without a pre-existing sump system 112, groundwater treatment system 110 may also comprise the sump system 112 as part of the overall treatment system. Sump system 112 preferably also comprises a pump 114 and discharge line 116 connected in fluid communication with tank 113 to feed groundwater into treatment system 110.

The treatment stages of system 110 (e.g. 130, 170, 180) may be located some distance from the sump system. As such, pump 114 preferably comprises a VFD (variable frequency drive or constant pressure) pump to aid in maintaining pressure throughout system 110. If needed, and depending on the distances between sump 112, stages 130, 170, 180, and an end use system, one or more auxiliary pumps may need to be included in system 110, such as on line 178 or line 196, to maintain sufficient pressure of the groundwater flowing through the system 110.

Groundwater treatment system 110 also preferably comprises a conductivity monitoring system comprising at least one and preferably at least two conductivity sensors 126-1, 126-2, etc. connected to a conductivity monitor or conductivity controller 128. The conductivity sensors 126-1, 126-2 measure the conductivity level of the groundwater as it flows through treatment system 110. Measuring the conductivity level is important for both the components of treatment system 110 and the components of the non-potable end use application. For example, an end use cooling tower application is sensitive to conductivity level of the water cycling through the cooling tower system. If the conductivity is too high the surfaces of the cooling tower may experience a scaling effect. If the conductivity is too low the water is corrosive to metal components in the cooling tower. Both issues negatively impact the operation and efficiency of the cooling tower and require costly treatments to counteract the effects of scaling or corrosion. Additionally, most cooling towers and similar systems have their own conductivity sensors that are set to go into a blow-down mode (where the water is discharged to the drain) when the conductivity level exceeds a predetermined threshold. Since groundwater typically has a higher conductivity level due to its mineral content compared to potable water sources that may otherwise be used to feed into the end use cooling tower or similar system application, control of the conductivity level before the groundwater being treated in system 110 reaches the end use application is important.

Monitoring conductivity level in system 110 can also aid in protecting the sensitive membranes in the reverse osmosis system 180. Conductivity monitor 128 is preferably configured to receive signals from sensors 126-1, 126-2, etc. and to send signals to other components of system 110. Conductivity monitor 128 may be directly connected to such components or may be connected to or a sub-system of main controller 158.

Most preferably, a first conductivity sensor 126-1 is disposed upstream of ultrafiltration membrane unit 131 and upstream an injection point for the cleaning composition from the cleaning composition dosing system. A second conductivity sensor 126-2 is most preferably disposed downstream of membrane unit 131 and upstream of reverse osmosis system 180 (and upstream of optional water softener system 170, preferably upstream of three-way valve 173, when included in system 110). Conductivity sensors 126-1, 126-2 may also be placed in other locations within system 110 and/or additional conductivity sensors may be used. If only a single conductivity sensor is used, it is preferably in the location of sensor 126-2, downstream of ultrafiltration membrane unit 131.

Other sensors may also be used with system 110 to measure other parameters of the groundwater quality, such as pH or ORP, as desired. Other sensors may also be used to very addition of any treatment compositions to the groundwater (such as a cleaning composition/$H_2O_2$ from cleaning composition dosing system or anti-scalant from anti-scalant dosing system) or to determine how much of any treatment compositions added to the groundwater are present at various stages of system 110, if desired. These other sensors may be connected to other components of system 110 (such as pump 122, pump 204, three-way valves 138, 148, 173 or other components) directly or, more preferably, through controller 158, to actuate delivery of treatment compositions, to bypass treatment stages in system 110, and to activate and/or deactivate system 110 or otherwise redirect the flow of groundwater out of system 110 to the drain or sump 112 instead of to the end use application when any measured parameter (groundwater quality or treatment composition level) is above or below a predetermined threshold or outside of a predetermined range of threshold values for the parameter.

As components of an end use system may be located some distance (such as 1000's of feet) from system 110, an additional pump may need to be included in system 110, such as on line 178 or on permeate groundwater discharge line 196, to maintain sufficient pressure of the groundwater flowing through the system 110 to reach the end use system.

Operation of system 110 according to a preferred method preferably comprises the following steps: Groundwater is collected in tank 113 of sump system 112 (which may be part of system 110 or may be separate from system 110). The groundwater is preferably sampled and tested or measured for one or more water quality parameters, such as TSS, TDS, and hardness. These measurements are used to determine which of the three stages is best suited for the groundwater at the particular site where system 110 will be used (particularly whether water softener system 170 is needed) and to determine dosage amounts for a scale treatment composition. The groundwater is preferably periodically resamped and retested to determine if there are any changes in the water quality that require changes in operation of system 110 (such as taking water softener 170 off bypass) or in scale treatment composition dosage.

Pump 114 pumps groundwater out of tank 113 via line 116 to feed into a first treatment stage of system 110. The amount of groundwater seeping into tank 113 may fluctuate over time, such as when there is a lot of rain or a drought or other users are drawing from the groundwater. If more groundwater is available or seeping into tank 113 than is needed for the desired end use application, then some of the groundwater may be discharged to a drain or wastewater system to reduce the volume of groundwater to be treated in system 110. For example, if the end use is a cooling tower, the tower may not require as much make-up water as is collected in tank 113. Additionally, a continual flow of treated groundwater may not be needed for end use application, which may only need periodic flow of water. For example, if the end use is an equipment washing system, the equipment may only be washed periodically. More preferably, all of the groundwater available is treated in system 110 and the treated water is then stored for later use when the flow of groundwater may be reduced. Pump 114 may be connected to controller 158 to only pump groundwater into system 110 when water is needed by the end use application. Alternatively, pump 114 may be activated when a sufficient level of water is present in tank 113 and a three-way valve may be disposed on line 116, the three-way valve connected to the controller to discharge some or all of the groundwater to a drain or wastewater system rather than through treatment system 110, depending on the needs of the end us application.

Groundwater in feed line passes through water meter 118 where a flow rate is measured. Water meter 118 may continuously measure a flow rate of ground water through line 116 or may periodically measure a flow rate of ground water through line 116. If periodic, measurements may be triggered by a timer or based on a signal received from a controller 158. Preferably, water meter 118 periodically sends a signal or pulse to a pump 122 based on the flow rate of groundwater measured by meter 118. For example, a pulse is sent when a flow of groundwater exceeds a predetermined cumulative threshold, preferably around 0.5-1.5 gallons, most preferably around 1 gallon, which then resets the flow value to zero after the pulse is sent to begin the next pulse cycle. The threshold may be adjusted depending on the amount of groundwater feeding into system 110. Alternatively, meter 118 may send a signal to controller 158, which then sends a signal to pump 122 to activate and deactivate the pump 122.

The pulse or signal received by pump 122 activates it to pump a predetermined volume (which may be based on pump activation time) of cleaning composition from container 120 through supply line 124 to feed into the groundwater flowing through line 132. Pump 122 is deactivated after the predetermined volume of cleaning composition is withdrawn from container 120, such as by a timer integral with or connected to pump 122 or by a signal from controller 158. A preferred dosage or volume of cleaning solution added to the groundwater in system 110 is around 0.13 ml per pulse (preferably per gallon of groundwater), most preferably around 0.1 to 0.2 ml per pulse. A preferred cleaning composition is a 30% solution of $H_2O_2$, but other compositions may also be used. Supply line 124 is preferably connected to a groundwater flow line upstream of ultrafiltration system 130 and downstream of meter 118. The cleaning composition aids in maintaining the ultrafiltration membranes in ultrafiltration membrane unit 131 by killing biological contaminants so they do not grow on the membranes or other components in filtration system 130 and also aid in reducing scale formation.

After passing through water meter 118, a conductivity level of the groundwater is measured using a first conductivity sensor 126-1 disposed on line 132 downstream of meter 118 and upstream of where supply line 124 feeds into line 132. Conductivity sensor 126-1 preferably sends a signal to conductivity monitor 128 (or controller 158) where the signal is converted into a measurement of the groundwater's conductivity level at that location within the treatment stages of system 110.

After supply line 124 connects to line 132 to inject the cleaning composition, the groundwater (and cleaning composition) pass through a static mixer 134. The mixed cleaning composition and groundwater then flow through line 136 to feed into an ultrafiltration membrane unit 131 in a first treatment stage (filtration system 130). A three way valve 138 is preferably disposed on filtration system feed line 136 to allow the groundwater to flow into ultrafiltration membrane unit 131 or to pass to a drain. Valve 138 is preferably connected to controller 158 or conductivity monitor 128 to receive a signal to actuate the valve to direct the flow according to predetermined instructions. For example, if a conductivity measurement at sensor 126-1 exceeds a predetermined threshold or range of threshold values, the groundwater may be sent to the drain rather than processed through the remainder of system 110. Alternatively, a portion of the groundwater may flow to membrane unit 131 and another portion to the drain depending on the volume of groundwater flow and the volume needed to feed the end use application for system 110. According to another preferred embodiment, valve 138 is preferably disposed downstream of sensor 126-1, but both the valve and sensor may be located further upstream, particularly upstream of where supply line 124 feeds into line 132 or more preferably upstream of meter 118 so that dosing of a cleaning composition is not triggered for groundwater flow that is sent to the drain.

For groundwater processed through membrane unit 131, it passes through the ultrafiltration membrane(s) in the unit(s) and is discharged as a stage one treated stream (because in this preferred embodiment filtration system 130 is the first treatment stage) or a filtered groundwater through line 144. Filtered groundwater stream in line 144 preferably comprises 0.025 microns or less TSS.

A conductivity level of the filtered groundwater is preferably measured using a second conductivity sensor 126-2 disposed on line 144. Conductivity sensor 126-2 preferably sends a signal to conductivity monitor 128 (or controller 158) where the signal is converted into a measurement of the filtered groundwater's conductivity level at that location within the treatment stages of system 110.

The filtered groundwater then passes through a three-way valve 146. Three-way valve 146 connects lines 144, 164, and 148. In normal operation of system 110 (not a backwash cycle), filtered groundwater passes through valve 146 from line 144 to 148 and flow from backwash feed line 164 is blocked or off. A backwash recycle line 152 and a softener system feed line 150 are preferably connected to line 148. Most preferably a tee is used to connect these lines but another three-way valve may also be used. This connection allows a first portion of the filtered groundwater flowing through line 148 to pass through to line 150 and a second portion to pass to line 152. The second portion flows into a container 154 to store filtered groundwater for use in a backwashing cycle. A valve 156, preferably a float valve, is used to indicate a level of filtered groundwater container 154. When the level is high enough to trigger a float in float valve 156, the valve closes and no more filtered water flows into container 154 through backwash recycle line 152. Float valve 156 may also be configured to send a signal to controller 158 or to pump 162 or to valve 160 when the level of filtered groundwater in container 154 reaches the float level. Such a signal may be used to activate a backwash cycle. Alternatively, a backwash cycle may be activated by a timer or by another signal sent to valve 160 and/or pump 162 by controller 158 that is unrelated to float valve 156.

When a backwash cycle is activated, valve 138 is in a closed state (or open to discharge feed groundwater stream to the drain) to temporarily stop feeding a feed groundwater stream into ultrafiltration system 130, valve 160 is in an open state (or is actuated to an open state), pump 162 is activated, three-way valve 146 is actuated for backflow, and valve 142 is actuated to an open state. These activation steps are preferably carried out by signals from controller 158. As an alternative to closing valve 138 or setting it to discharge to the drain, pump 114 may be temporarily deactivated during a backwash cycle to stop feeding a feed groundwater stream into ultrafiltration system 130. Pump 162 pumps filtered groundwater from container 154 through backwash feed line 164. Three-way valve 148 is actuated for backflow to allow the filtered groundwater to flow from backwash feed line 164 through valve 148 and back through line 144 into ultrafiltration membrane unit 131 to backwash the membrane. The backwash water exits membrane unit 131 through backwash discharge line 140, passes through valve 142 and is returned to sump system 112 or is sent to a wastewater drain. A backwash cycle preferably continues for a predetermined period of time (typically less than 45 seconds). When a backwash cycle is complete, the actuation of valves 138 (or activation of pump 114), 148, 160, and 142 are reverted to their pre-backwash cycle state and pump 162 is deactivated. Normal operations of system 110 are then resumed. Container 154 is preferably never fully emptied, but when a backwash cycle is complete will begin filling again with the second portion of the filtered groundwater while the first portion of filtered groundwater continues through line 150 to a second treatment stage (optional water softener system 170) or a third treatment stage (reverse osmosis system 180).

Filtered groundwater in line 150 then flows through another three way valve 173 where it is either directed to bypass line 171 or softener feed line 173 (or a portion to each). Whether all or a portion of the filtered groundwater feeds into softener system 170 through feed line 173 depends on the hardness of the filtered groundwater. If softening is not needed, system 170 may be bypassed through bypass line 171. Valve 173 is preferably connected to controller 158 or conductivity monitor 128 to receive a signal to actuate the valve to direct the flow according to predetermined instructions. For example, if a conductivity measurement at sensor 126-2 (or 126-1, but preferably from 126-2 measured downstream of filtration system 130) exceeds a predetermined threshold or range of threshold values, the groundwater may be sent to softener system 170.

If the conductivity is below a predetermined threshold or range of threshold values, the groundwater may bypass softener system 170. Alternatively, a portion of the filtered groundwater may flow to system 170 and another portion may bypass system 170 depending on the conductivity reading or other groundwater quality measurement and volume of flow.

For filtered groundwater or any portion thereof processed through system 170, the filtered groundwater preferably passes through two softener units 172-1, 172-2 in parallel to remove calcium and magnesium in the filtered groundwater through ion exchange. Groundwater processed through softener units 172-1, 172-2 is discharged as a stage two treated stream (because in this preferred embodiment softener system 170 is the second treatment stage) or a softened groundwater stream through line 178, which feeds into reverse osmosis system 180. Most preferably the softened groundwater stream comprises 2 ppm or less total hardness.

Scale treatment is preferably added to the softened groundwater in line 178 upstream of reverse osmosis system 180. A dose of scale composition is pumped from container 202 using pump 204 through supply line 200. Supply line 200 is connected to line 178 to inject the scale treatment composition into the softened groundwater. Most preferably, pump 204 is configured to receive a signal from a timer or from controller 158 indicating when a dose of scale treatment composition should be delivered from tank 202 and the signal activates pump 204 to deliver a desired dosage. Alternatively, pump 204 may receive a pulse or signal from water meter 118, similar to pump 122. Scale treatment dosing is preferably triggered by the amount of groundwater flowing through water meter 118 or by a conductivity measurement (preferably from sensor 126-2) or measurement of another water quality parameter. As another alternative, dosage (activation of pump 204) may also be triggered by a timer. Preferred dosage amounts are as previously described. Gravity feed from container 202 may also be used instead of pump 204. When gravity feed is used, a valve is activated to allow sufficient flow of scale treatment product from container 202 to achieve the desired dosage. Activation of the valve may be either by flow through water meter 118 (directly connected to water meter 118 or through controller 158), conductivity measurement or other water quality parameter measurement, or by a timer. Other injection systems, such as a venturi injector, may also be used to deliver scale treatment composition into the groundwater upstream of reverse osmosis system 180.

The softened groundwater (and scale treatment composition) then feed into reverse osmosis pump 182 exiting through line 184. It then feeds into one or more reverse osmosis membrane units 186-1, 186-2, 186-3, etc. preferably arranged in series. A permeate discharge line 188-1 from a first membrane unit 186-1 feeds into a second membrane unit 186-2. A permeate discharge line 188-2 from the second membrane unit 186-2 feeds into a third membrane unit 186-3, etc. Most preferably, there are five membrane units 186 and they are operated at low pressure of around 30 psi. A permeate stream from the last of the membrane units is discharged as a stage three treated stream (because in this preferred embodiment reverse osmosis system 180 is the third treatment stage) or a permeate groundwater stream is discharged through discharge line 196. Permeate groundwater stream is a feed stream into the desired end use application. Line 196 may feed directly into the end use application or to a storage tank for later use in the end use application or a combination thereof. Most preferably, the permeate groundwater stream has water quality parameters that are no worse than those of a municipal or similar water supply source at the location where system 110 is used; however, the permeate groundwater stream does not need to be of the same quality as potable water for used in the end system.

A control system preferably comprises a controller 158 and various standard components related thereto, such as a power switch, a wire relay, and integrated wire board, and a plurality of wires or connectors to connect components of treatment system 110 (e.g. valve 146) to controller 158 or to another component (e.g. conductivity monitor 128). Controller 158 is preferably configured to receive signals (preferably in millivolts) from sensors 126-1, 126-2 and other measurement sensors used in system 110, and optionally water meter 118 and float valve 156. Any measurement sensors in system 110 are preferably disposed inline through a port installed on a flow line through which groundwater or a treatment composition flows to directly measure the groundwater flowing through that line. As an alternative; a portion of groundwater may be diverted from a flow line (e.g. line 144) to a sub-circuit into which a sensor (such as sensor 126-2) is installed with the diverted groundwater being reintroduced into the same or a different flow line (e.g. line 144 or line 148) after measuring.

Controller 158 (and/or conductivity monitor 128) may optionally be configured to convert the signal from any sensor into a measurement of a parameter using a different value conversion or scale, such as converting a millivolt signal from a sensor (such as 126-1) into a conductivity level in line 132, for example and if desired. Controller 158 is further preferably configured to compare one or more measurements (either as a raw signal or a converted measurement), most preferably each sensor measurement, to a predetermined threshold or range or to one or more prior measurements of the same parameter. Most preferably, each parameter measures has a lower predetermined threshold or a lower alarm point and a higher predetermined threshold or higher alarm point.

If the comparison of any measurement indicates that the parameter is above or below its threshold or alarm point, controller 158 is further configured to send a signal to a component to initiate corrective action or to shutdown or disable treatment system 110 when necessary. Corrective action may include dosing a cleaning composition from container 120, dosing scale treatment composition from container 202, fully or partially bypassing water softener system 170, initiating a backwash cycle, or fully or partially bypassing treatment system 110 by sending all or a portion of groundwater from sump system 112 to the drain or a wastewater system. Although it is preferred that controller 158 automatically take corrective action in accordance with pre-programmed instructions, controller may also be configured to send an alert to a user that corrective action needs to be taken so that the user can manually operate manually initiate sending signals to operate components of system 110.

Controller 158 may also be configured to trigger an alert, such as an audible or visual alarm or to send a signal or message to a user, to indicate that a measurement is above or below one of the thresholds or range of thresholds; to store measurement data and send or allow transfer of historic data to another device, such as a computer, tablet, or cell phone. A control system also preferably comprises a user interface, preferably with a display screen and one or more buttons or a touchscreen to allow user inputs. Most preferably, a user may view information regarding treatment system 110 on a display screen, such as measurements, flow rates, comparisons, activation of status of pumps and valves, cleaning or scale treatment dosage amounts, and input data or instructions into system 110 using one or more buttons or a touch screen, such as instructions to recall information to be displayed, to change one of the thresholds, to manually activate a pump or manually stop a pump, and/or to turn system 110 on or off (which may also be done with a power switch).

Controller 158 may optionally be configured to alert a user of a low level of cleaning or scale treatment compositions in containers 120, 202 or brine level in container 176 by sending a signal or message to a user or trigger an audible or visual alarm when a level reaches a predetermined threshold or predetermined low level so that a user can be alerted that these containers needs refilling or replacement. Any of these containers may further comprise a level sensor disposed in or on the container and configured to send signals to controller 158 indicating the level in the container. Alternatively, controller 158 may be configured to calculate and track the amount of the compositions from these containers used in system 110 and to compare it to an initial volume of in the compositions in the containers to calculate a level of the composition in its respective container. Controller 158 may be configured to initiate a low level alert when the remaining volume of disinfectant in any of the containers is below a predetermined threshold, such as 10% or 5% volume remaining to indicate the container is near empty (or actually empty, if desired) so that it may be refilled or replaced. According to yet another preferred embodiment, controller 158 also tracks inventory of replacement containers or a replenishment volume of the compositions to be added to refill the respective containers and can provide an alert or automatically send a replacement order to replenish inventory of the compositions when the supply of such is low.

Various components of a treatment system 10, 110 were field tested by applicant. In a first trial, only a single treatment stage was used. The single treatment stage was a high-pressure, three membrane unit (e.g. 186-1, 186-2, and 186-3) reverse osmosis system was connected to an existing sump system 12, 112 to treat groundwater to feed into an existing cooling tower at the trial site. The treatment system failed immediately and was unable to produce any permeate water to feed the cooling tower system. The groundwater was tested and found to contain high amounts of TDS and TSS.

A few months after the first trial, a second trial was conducted at the same building site where an additional treatment stage was added. The additional treatment stage was an ultrafiltration membrane unit (e.g. 131), added upstream of the high pressure reverse osmosis units. This two stage system was more successful than the single stage system, but the addition of the ultra-filtration membrane only removed the TSS from the ground water. This still resulted in low flow rates (less than 500 gallons per day) and fouling of the reverse osmosis membranes, as well as posing a risk of damage to equipment in the end use application (in this trial a cooling tower) as a result of the high TDS content in the treated groundwater. This second trial system failed within a month due to the high TDS level.

To address the TDS issue, a third treatment stage was added in a third trial. This treatment stage was a water softener system added between the ultrafiltration system and the reverse osmosis system to address the high TDS content. Additionally, the reverse osmosis system was changed from a three membrane high pressure system to a five membrane low pressure system. The inventors discovered that it was difficult to maintain consistent and adequate pressure in system 110 based on the distance between sump 12, 112 and the reverse osmosis stage to operate high pressure membranes systems without creating a pressure fault that would interrupt operation. The use a low pressure membrane system helped solve that issue. Alternatively, the inventors discovered that a VFD pump for the sump pump, or the use of one or more auxiliary pumps in system 10, 110 could resolve the pressure problems from the trials. However, it is desirable to minimize the number of pumps used for equipment costs and energy costs, so it is most preferred to only use a single pump (the sump pump) in system 10, 110. The combined use of the three treatment stages in a preferred order according to one embodiment of the invention in this third trial—with the first stage being an ultrafiltration system 30, 130, the second stage being a water softener system 70, 170, and the third stage being a reverse osmosis system 80, 180—caused an increase of reclaimed, treated groundwater to feed into the end use application from less than 500 gallons per day to 7000 gallons per day.

Most preferably, the groundwater at a particular installation site for a treatment system 10, 110 is tested prior to installing the treatment system to determine whether the water softener system 70, 170 is needed for the particular site and whether the reverse osmosis system should be a high pressure or low pressure system and to determine the number of reverse osmosis membrane units.

Systems 10, 110 may include other standard fluid system components, such as valves, connectors, pumps, tees, injectors, venturi injectors as will be understood by those of ordinary skill in the art. Any action carried out by a comparison of a measurement to a predetermined threshold or range of threshold values may also preferably be carried out manually or by a manual input into a controller that sends a signal to carry out the action. All fluid flows, pumps, and containers referred to as connected to another component (e.g. a flow line connected to a tank) for flow of groundwater or a treatment composition through system 10, 110 are connected in fluid communication and may include other standard fluid components for such connections. Injection ports, manifolds, or tees may be used to add a treatment composition from a supply line to a groundwater flow line.

References herein to measurements, reading, calculating or measuring a value, parameter, or property and the like are intended to include any form of direct measurement, converting data or a signal, making a calculation based on one or more data points or signals, or otherwise comparing, interpreting, correlating, or manipulating one or more data points or signals unless specifically excluded. Unless specifically excluded, any preferred features and optional components of any preferred embodiment of a system and/or preferred method steps described herein may be used with any other embodiment, even if not specifically described herein with that particular embodiment. All dimensions, sizes, numerical amounts, numerical ratings, ratios, or percentages indicated herein as a range include each individual amount or ratio within those ranges and any and all subset combinations within ranges, including subsets that overlap from one preferred range to a more preferred range. Those of ordinary skill in the art will also appreciate upon reading this specification, including the examples contained herein, that modifications and alterations to the preferred embodiments of may be made within the scope of the invention and it is intended that the scope of the invention disclosed herein be limited only by the broadest interpretation of the appended claims to which the inventor is legally entitled.

What is claimed:

1. A method of reclaiming and treating groundwater, the method comprising:

feeding a feed groundwater stream into an ultrafiltration system to produce a filtered groundwater stream comprising a lower amount of TSS than an amount of TSS in the feed groundwater stream and a lower amount of biological contaminants than an amount of biological contaminants in the feed groundwater stream;

feeding a first portion of the filtered groundwater stream into (1) a reverse osmosis system to produce a permeate groundwater stream and a concentrate stream or (2) a water softener system to produce a softened groundwater stream comprising a lower amount of TDS than an amount of TDS in the filtered groundwater stream and feeding the softened groundwater stream in the reverse osmosis system to produce the permeate groundwater stream and the concentrate stream; and feeding the permeate groundwater stream into an end use system that is configured to allow use of non-potable water, the end use system comprising an irrigation system, a pond, an equipment washing system, a cooling system, or a heating system.

2. The method of claim 1 further comprising:

collecting groundwater in a sump system disposed in an underground level of a building or building site;

pumping at least a portion of the collected groundwater to produce the feed groundwater stream.

3. The method of claim 2 further comprising:

dosing an amount of scale treatment composition into (1) the first portion of the filtered groundwater stream that feeds into the reverse osmosis system or (2) the softened groundwater stream that feeds into the reverse osmosis system; and dosing an amount of a cleaning composition comprising $H_2O_2$ into the feed groundwater stream upstream of the ultrafiltration system.

4. The method of claim 3 further comprising measuring a flow rate of the feed groundwater stream; and wherein the dosing an amount of cleaning composition step comprises activating a first pump to pump a volume of the cleaning composition from a first tank into a flow line through which the feed groundwater stream flows; and wherein the first pump is activated based on the measured flow rate of the feed groundwater stream.

5. The method of claim 4 further comprising measuring a conductivity level of the feed groundwater stream or the filtered groundwater stream or both.

6. The method of claim 5 further comprising:

diverting a second portion of the filtered groundwater stream to a backwash holding tank until a predetermined fill level in the backwash holding tank is achieved;

periodically backwashing the ultrafiltration system, wherein the backwashing step comprises: stopping supply of the feed groundwater stream to the ultrafiltration system and production of the filtered groundwater stream during a backwash cycle; pumping at least some of the second portion of the filtered groundwater stream out of the backwash holding tank and back through the ultrafiltration system during the backwash cycle to produce a backwash stream; discharging the backwash stream to the sump system or to a wastewater drain; and resuming supply of the feed groundwater stream to the ultrafiltration system and producing the filtered groundwater stream when the backwash cycle is complete.

7. The method of claim 5 wherein the reverse osmosis system comprises three to five low pressure reverse osmosis membranes.

8. The method of claim 7 wherein the end use system is a cooling tower, the filtered groundwater stream feeds into the water softener system, and the permeate groundwater stream is a make-up water stream for the cooling tower.

9. The method of claim 6 wherein the periodic backwashing the ultrafiltration system step is initiated based on the conductivity level of the filtered groundwater stream or when the predetermined fill level in in the backwash holding tank is reached or a combination thereof.

10. The method of claim 5 wherein the dosing an amount of scale treatment composition step comprises activating a second pump to pump a volume of a scale treatment composition from a second tank into a flow line through which the stream that feeds into the reverse osmosis system flows; and wherein the second pump is activated based on the measured conductivity level of the filtered groundwater stream.

11. The method of claim 10 wherein the reverse osmosis system comprises three to five low pressure reverse osmosis membranes.

12. The method of claim 11 wherein the end use system is a cooling tower, the filtered groundwater stream feeds into the water softener system, and the permeate groundwater stream is a make-up water stream for the cooling tower.

13. A system for reclaiming and treating groundwater, the system comprising:

an ultrafiltration system configured to receive a feed groundwater stream and produce a filtered groundwater stream comprising a lower amount of TSS than an amount of TSS in the feed groundwater stream and a lower amount of biological contaminants than an amount of biological contaminants in the feed groundwater stream;

a water softener system configured to selectively receive a water softener feed stream to produce a softened water stream comprising a lower amount of TDS than an amount of TDS in the water softener feed stream;

a reverse osmosis system configured to receive a reverse osmosis feed stream and produce a permeate groundwater stream and a concentrate stream;

a first valve configured to selectively bypass the water softener system, wherein when the water softener system (1) is not bypassed, the water softener feed stream comprises a first portion of the filtered groundwater stream and the reverse osmosis feed stream comprises the softened water stream or (2) is bypassed, the reverse osmosis feed stream comprises the first portion of the filtered groundwater stream;

a first discharge line in fluid communication with the reverse osmosis system and an end use system that is configured to allow use of non-potable water, the end use system comprising an irrigation system, a pond, an equipment washing system, a cooling system, or a heating system; and wherein the permeate groundwater stream is discharged through the first discharge line to the end use system.

14. The system of claim 13 further comprising:

a scale treatment dosing system comprising a first container configured to hold a volume of a scale treatment composition, a first pump configured to pump a dose of the scale treatment composition, and a first supply line in fluid communication with the first container and a flow line through which the reverse osmosis feed stream flows to deliver the dose of scale treatment composition; and a cleaning composition dosing system comprising a second container configured to hold a volume of a cleaning composition comprising $H_2O_2$, a second pump configured to pump a dose of the cleaning composition, and a second supply line in fluid communication with the second container and a flow line through which the feed groundwater stream flows to deliver the dose of cleaning composition.

15. The system of claim 14 further comprising a flow meter configured to measure a flow rate of the feed groundwater stream; and wherein the second pump is configured to be activated to deliver the dose of cleaning composition based on the measured flow rate of the feed groundwater stream.

16. The system of claim 15 further comprising a first conductivity sensor and a second conductivity sensor; and a controller to configured to receive signals from the first and the second conductivity sensors, to convert the signals from the first conductivity sensor into a measurement of a conductivity level of the feed groundwater stream, and to convert the signals from the second conductivity sensor into a measurement of a conductivity level of the filtered groundwater stream.

17. The system of claim 16 further comprising:

a backwash holding tank configured to receive and temporarily hold a second portion of the filtered groundwater stream;

a second valve configured to temporarily stop a flow of the feed groundwater stream into the ultrafiltration system during a backwash cycle;

a third pump configured to pump the second portion of the filtered groundwater stream out of the backwash holding tank and through the ultrafiltration system during the backwash cycle to produce a backwash stream;

a second discharge line configured to discharge the backwash stream from the ultrafiltration system;

wherein the controller is further configured to periodically send signals to actuate the second valve and the third pump to initiate the backwash cycle and to resume feeding the feed groundwater stream into the ultrafiltration system when the backwash cycle is complete.

18. The system of claim 17 wherein the periodic backwash cycle is initiated by the controller based on the measurement of the conductivity level of the filtered groundwater stream or when a predetermined fill level in in the backwash holding tank is reached or a combination thereof.

19. The system of claim 16 wherein the controller is further configured to send a signal to the first pump to activate the first pump to deliver the dose of the scale treatment composition based on the measurement of the conductivity level of the filtered groundwater stream.

20. The system of claim 19 wherein the reverse osmosis system comprises three to five low pressure reverse osmosis membranes.

21. The system of claim 20 wherein the end use system is a cooling tower, the water softener feed stream is the first portion of the filtered groundwater stream, and the permeate groundwater stream is a make-up water stream for the cooling tower.

22. The system of 16 wherein the reverse osmosis system comprises three to five low pressure reverse osmosis membranes.

23. The system of claim 22 wherein the end use system is a cooling tower, the water softener feed stream is the first portion of the filtered groundwater stream, and the permeate groundwater stream is a make-up water stream for the cooling tower.

\* \* \* \* \*